March 17, 1931.  J. G. ZOLLEIS  1,796,740
CONDUIT HOUSING
Filed Sept. 23, 1929
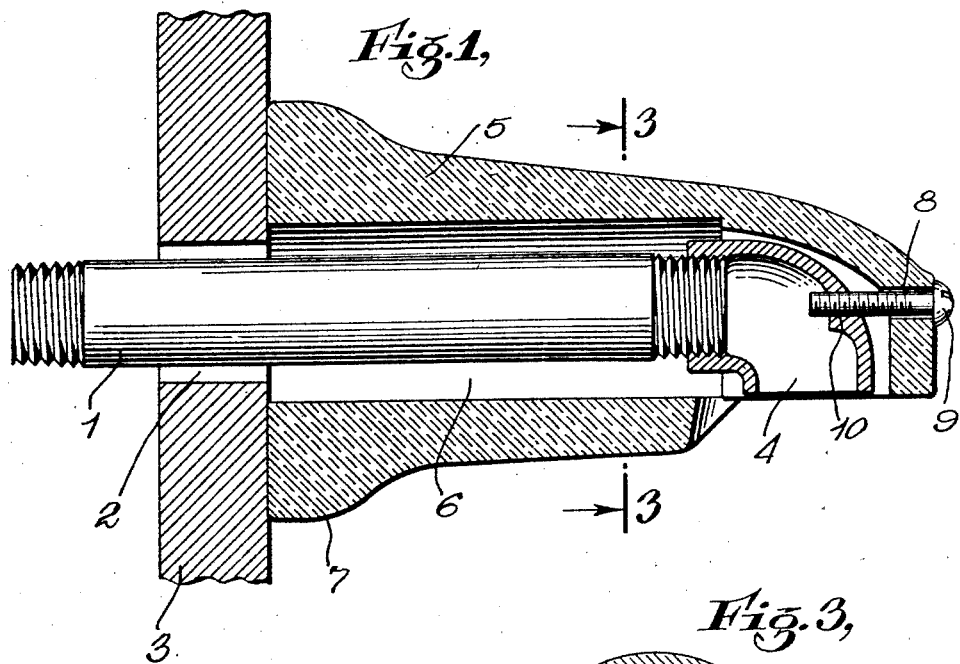
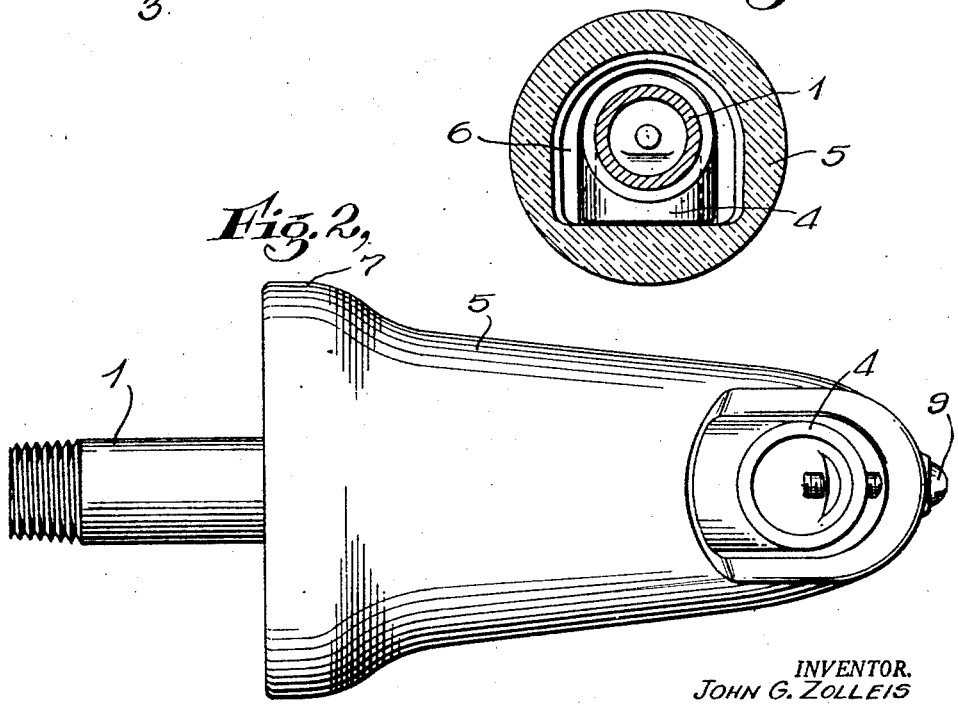
INVENTOR.
JOHN G. ZOLLEIS
BY Meyers + Jones
ATTORNEYS.

Patented Mar. 17, 1931

1,796,740

UNITED STATES PATENT OFFICE

JOHN G. ZOLLEIS, OF GERMANTOWN, PENNSYLVANIA

CONDUIT HOUSING

Application filed September 23, 1929. Serial No. 394,497.

This invention is an improvement in conduit housings of ceramic material, and more particularly in a housing designed for the inlet pipes of bathtubs, and the like.

Difficulty has been experienced in fitting ceramic conduit housings on metal inlet pipes for bathtubs and the like, in that the downward bend of the inlet pipe interferes with the placing of the housing.

Heretofore the housings have been provided with a downward bend conforming substantially to that of the bend of the inlet pipe, and it is apparent that to slip a housing so constructed of a reasonable size of bore over the inlet pipe is impossible.

One of the primary objects of the present invention is the provision of a construction of housing, such that it may be slipped over the usual inlet pipe, regardless of the bend, thus to provide an integral all ceramic covering for the pipe.

With these and other objects in view the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the drawings forming a part hereof:—

Fig. 1 is a longitudinal section of the improved housing, in place against the wall.

Fig. 2 is a bottom plan view.

Fig. 3 is a section on the line 3—3 of Fig. 1.

The present embodiment of the invention is shown in connection with an inlet pipe 1, of usual construction and arrangement, extending through an opening 2, in a wall 3, and provided with an elbow 4 at its discharge end. The inlet pipe and nozzle are as usual of metal, and the housing is provided for shielding and concealing the metal to provide a ceramic finish.

The housing indicated generally at 5, usually of china, is molded or cast in suitable dies, providing a central opening 6 of greater diameter than the external diameter of the inlet pipe, so that when the housing is in place, there is an annular space between the housing and the pipe.

The housing is of a length to extend from the wall to and beyond the elbow 4, and it is substantially frusto-conical externally. The large end is plane, as shown, to abut the wall, and adjacent to this end the housing is externally enlarged, as shown at 7, to provide a neat finish between the wall and the housing.

The outer or small end of the housing is closed, and a portion of the material of the housing is omitted at the said small end, this portion being defined in part by a plane substantially parallel with the axis of the housing. The depth of the omitted part is the thickness of the housing wall. The omitted part provides an opening adjacent the small end of the housing greater than the area of the open end of the elbow, as shown in Fig. 1, and the elbow is of such dimensions that the open end is substantially flush with the plane which defines what may be considered as the axial or longitudinal wall of the housing opening.

The closed end of the housing is provided with an opening 8 for receiving a screw 9, and the elbow has an internally threaded opening 10 adapted to aline with the opening 8, for engagement by the screw, thus to connect the housing to the elbow, and to hold it in place against the wall. The provision of the connection just described enables adjustment for varying thicknesses of wall.

In placing the improved housing, the pipe and elbow being in place, the housing is slipped over the pipe, the internal opening of the housing being of a size to permit the passage of an elbow, until the plane end of the housing abuts the wall. The screw is then inserted and engaged in the opening 10, and it will be apparent that if the wall is a little thicker than normal, or a little thinner, the housing may be adjusted with respect to the pipe, it being understood that the screw 9 is turned until the plane end of the nozzle is in firm engagement with the wall.

The size of the opening at the small end of the housing enables relative movement of the elbow and housing, without bringing the elbow out of register with the housing opening. When in place, the housing provides an ornamental casing wholly concealing the metal parts, and presenting an all ceramic finish.

It will be apparent from the drawing that the metal of the inlet pipe does not touch the conduit housing, so that there will be no conduction in heat from the pipe to the housing, when used with a hot water inlet. The improved housing is especially adapted for use with pipes having a lateral discharge, in that it may be fitted over a pipe of this character, and when so placed will conceal all of the metal parts.

The valve (not shown) for regulating the flow through the inlet 1 is connected to the threaded end of the inlet pipe at the end remote from the elbow 4.

What is claimed as new is:—

1. A housing of ceramic material of substantially frusto-conical shape and having the small end closed, a portion of the material of the side wall being omitted adjacent the small end to provide an opening, said omitted portion being defined in part by a plane substantially parallel with the axis of the housing.

2. A housing of ceramic material of substantially frusto-conical shape and having the small end closed, a portion of the material of the side wall being omitted adjacent the small end to provide an opening, said omitted portion being defined in part by a plane substantially parallel with the axis of the housing, and means to connect the housing to a discharge pipe.

3. A housing of ceramic material of substantially frusto-conical shape and having the small end closed, a portion of the material of the side wall being omitted adjacent the small end to provide an opening, said omitted portion being defined in part by a plane substantially parallel with the axis of the housing, and means to connect the housing to a discharge pipe, said means enabling relative longitudinal movement of the housing and pipe.

4. In combination with a pipe having a lateral discharge, a conduit housing of ceramic material of substantially frusto-conical shape and having the small end closed, a portion of the material of the side wall being omitted adjacent the small end to provide an opening for the lateral discharge, said omitted portion being defined in part by a plane substantially parallel with the axis of the housing, and a screw passing through the small end of the housing and engaging a threaded opening in the pipe to connect the parts together.

Signed at Philadelphia in the county of Philadelphia and State of Pennsylvania, this 20th day of September, A. D. 1929.

JOHN G. ZOLLEIS.